(12) United States Patent
Luc et al.

(10) Patent No.: US 8,769,251 B2
(45) Date of Patent: Jul. 1, 2014

(54) DATA PROCESSING APPARATUS AND METHOD FOR CONVERTING DATA VALUES BETWEEN ENDIAN FORMATS

(75) Inventors: Philippe Luc, Nice (FR); Norbert Bernard Eugéne Lataille, Le Cannet (FR); Florent Begon, Antibes (FR); Nicolas Chaussade, Mouans-Sartoux (FR)

(73) Assignee: ARM Limited, Cambridge (GB)

( * ) Notice: Subject to any disclaimer, the term of this patent is extended or adjusted under 35 U.S.C. 154(b) by 1916 days.

(21) Appl. No.: 11/637,948

(22) Filed: Dec. 13, 2006

(65) Prior Publication Data

US 2008/0148029 A1    Jun. 19, 2008

(51) Int. Cl.
*G06F 7/00*  (2006.01)
*G06F 15/00*  (2006.01)

(52) U.S. Cl.
USPC .......................................................... 712/300

(58) Field of Classification Search
None
See application file for complete search history.

(56) References Cited

U.S. PATENT DOCUMENTS 5,819,117 A *  10/1998  Hansen ......................... 712/300
2004/0010676 A1*  1/2004  Maciukenas .................. 711/202

* cited by examiner

*Primary Examiner* — Corey S Faherty
(74) *Attorney, Agent, or Firm* — Nixon & Vanderhye P.C.

(57) ABSTRACT

A data processing apparatus and method are provided for converting data values from a first endian format to a second endian format. Swizzle circuitry is provided for receiving a block of data containing at least one data value, and for converting each data value from the first endian format to the second endian format. The swizzle circuitry comprises first swizzle circuitry for performing a re-ordering operation on the block of data assuming the at least one data value contained therein is of a first size, in order to produce re-ordered data. Second swizzle circuitry is provided which is responsive to an indication that the at least one data value is of a size different to the first size to perform an additional re-ordering operation on the re-ordered data having regard to the size of the at least one data value in order to convert each data value to the second endian format.

13 Claims, 9 Drawing Sheets

MEMORY 108: P O N M L K J I
100: H G F E D C B A

|  |  | BIG ENDIAN FORM | LITTLE ENDIAN FORM |
|---|---|---|---|
| LDRB | 100 | A | A |
|  | 101 | B | B |
|  | 102 | C | C |
|  | 103 | D | D |
|  | 104 | E | E |
|  | 105 | F | F |
|  | 106 | G | G |
|  | 107 | H | H |
| LDRH | 100 | B A | A B |
|  | 101 | C B | B C |
|  | 102 | D C | C D |
|  | 103 | E D | D E |
|  | 104 | F E | E F |
|  | 105 | G F | F G |
|  | 106 | H G | G H |
|  | 107 | I H | H I |
| LDR | 100 | D C B A | A B C D |
|  | 101 | E D C B | B C D E |
|  | 102 | F E D C | C D E F |
|  | 103 | G F E D | D E F G |
|  | 104 | H G F E | E F G H |
|  | 105 | I H G F | F G H I |
|  | 106 | J I H G | G H I J |
|  | 107 | K J I H | H I J K |

FIG. 7

DATA PROCESSING APPARATUS AND METHOD FOR CONVERTING DATA VALUES BETWEEN ENDIAN FORMATS

TECHNICAL FIELD

The technical field relates to a data processing apparatus and method for converting data values between different endian formats.

BACKGROUND

Two types of data format are commonly supported within the computing industry, namely big-endian and little-endian. In little-endian format, an address for a data value identifies the least significant byte of the addressed data value, and hence in little-endian notation byte [0] is used to denote the least significant byte of the data value. In big-endian format, the address for a data value identifies the most significant byte of the addressed data value, and accordingly byte [0] is used in big-endian notation to identify the most significant byte of the data value.

A data value can be considered as consisting of a number of data elements, where a data element is the basic unit of addressable data. Hence, typically, a data element will be a byte of data, and the data value will consist of a plurality of bytes, e.g. four bytes for a 32-bit data value, eight bytes for a 64-bit data value, etc. When swapping the endianness of a data value, the ordering of the constituent data elements (e.g. bytes) is reversed. Hence, if a big-endian 32-bit data value consists of the bytes ABCD then the swapping of the endianness of that data value will result in the equivalent little-endian data value DCBA.

Within any particular data processing apparatus, there may be some circuitry which handles data in one endian format, whilst other circuitry within the data processing apparatus handles data in a different endian format. Assuming data values are to be shared between such circuitry, then mechanisms need to be provided for converting data values from one endian format to the other endian format. Considering as an example a processor incorporating a processor core, the processor will typically be coupled via a bus interconnect with a number of other devices. The processor core will typically be arranged to apply operations to data in one particular endian format, and hence by way of example may be arranged to apply operations to data in little-endian format. If such a processor is to be arranged to share data with another device of the data processing apparatus that operates on data using big-endian format, then an endian conversion operation needs to be performed on data as it is read into, and written out of, the processor core.

An added complexity is that the data values operated upon within a data processing apparatus can be of various different sizes, and the exact re-ordering required when performing endian conversion will be dependent on the size of the data values being handled at the time. The action of re-ordering the constituent data elements (e.g. bytes) of data values in order to perform endian conversion is often referred to as "swizzling" the data elements, and the circuitry provided for performing such re-ordering is often referred to as swizzle circuitry. Due to the need to cater for data values of various different sizes, the swizzle circuitry becomes complex, and for example will include many multiplexers that add propagation delay to the data path. For certain paths where such swizzle circuitry is required, the complexity of the swizzle circuitry can lead to those paths becoming a critical path within the data processing apparatus, thereby limiting the speed at which the data processing apparatus can be run. For example, considering a processor having a processor core coupled to a level one data cache, if the processor core operates on data values in little-endian format, but the processor interfaces with big-endian devices within the data processing apparatus, such swizzle circuitry may be required in the path over which data read from the level one cache is returned to the processor core. Such a path may represent a critical timing path, with the complexity of the swizzle circuitry contributing to the delay in that path.

Accordingly, it would be desirable to provide improved swizzle circuitry which can be used to alleviate the timing on such critical paths, whilst still catering for performing swizzle operations in connection with data values of various different sizes.

SUMMARY

Viewed from a first aspect, the provides a data processing apparatus comprising: first circuitry for handling different sized data values according to a first endian format, each data value consisting of a number of data elements with the number being dependent on the data value size; second circuitry for handling the data values according to a second endian format where the data elements of the data values are ordered differently with respect to their ordering in the first endian format; swizzle circuitry for receiving from the first circuitry a block of data containing at least one data value, and converting each data value in the block from the first endian format to the second endian format, the swizzle circuitry comprising: first swizzle circuitry for performing a reordering operation on the block of data assuming the at least one data value contained therein is of a first predetermined size, in order to produce reordered data; second swizzle circuitry responsive to an indication that the at least one data value is of a size different to said first predetermined size to perform an additional reordering operation on the reordered data having regard to the size of the at least one data value in order to convert each of the at least one data value to the second endian format; the swizzle circuitry being responsive to an indication that the at least one data value is of said first predetermined size to output to the second circuitry the reordered data produced by the first swizzle circuitry, whereas otherwise the swizzle circuitry outputs to the second circuitry the data produced by the second swizzle circuitry.

The swizzle circuitry comprises first swizzle circuitry for performing a re-ordering operation on a block of data, where that re-ordering operation is done on the assumption that the one or more data values contained within that block of data are of a first predetermined size. Additionally, the swizzle circuitry includes second swizzle circuitry responsive to an indication that the one or more data values within the block of data are of a size different to the first predetermined size to perform an additional re-ordering operation on the re-ordered data output by the first swizzle circuitry having regard to the actual size of the one or more data values, so as to produce at its output data which has been correctly converted from the first endian format to the second endian format.

The swizzle circuitry is responsive to an indication that the at least one data value in the block of data is of the first predetermined size to output the re-ordered data produced by the first swizzle circuitry, whereas otherwise the swizzle circuitry outputs the data produced by the second swizzle circuitry.

By such an approach, the swizzle circuitry is optimised to rapidly perform the required endian conversion for data values of the first predetermined size, at the expense of requiring additional time to perform the required endian conversion for data values which are not of that first predetermined size. This enables a reduction in the complexity of the circuitry provided on the critical path, because the swizzling is done speculatively expecting the data values to be of the first predetermined size. Hence the timing of the path when handling data values of the first predetermined size is significantly reduced, thereby improving the speed of operation when handling such data values.

In one embodiment, the second swizzle circuitry is arranged to perform the additional reordering operation in at least one clock cycle subsequent to a clock cycle in which the reordered data is produced by the first swizzle circuitry, whereby if the at least one data value is of said first predetermined size, the swizzle circuitry converts each data value in the block from the first endian format to the second endian format at least one clock cycle more quickly than if the at least one data value is of a size other than said first predetermined size. By allowing the additional re-ordering operation performed by the second swizzle circuitry to take place in at least one subsequent clock cycle, the clock speed is no longer constrained by the need to perform all possible swizzling re-ordering within the same clock cycle. In one embodiment, the first swizzle circuitry does not take an entire clock cycle to perform the re-ordering operation, and accordingly the operation of the first swizzle circuitry can be included within a clock cycle where other actions are taken, for example being included within the cycle in which the data is read from the first circuitry.

In one particular embodiment, the first swizzle circuitry is arranged to perform the reordering operation in a first clock cycle, and the second swizzle circuitry is arranged to perform the additional reordering operation in a next clock cycle, whereby if the at least one data value is of said first predetermined size, the swizzle circuitry converts each data value in the block from the first endian format to the second endian format one clock cycle more quickly than if the at least one data value is of a size other than said first predetermined size. Hence, the clock speed can be increased relative to a prior art system where the swizzle circuitry required sufficient multiplexing logic to allow all possible swizzle operations to be performed within a single cycle. Instead, the complexity of the swizzle circuitry on the critical path can be reduced, in that it now only needs to perform endian conversion assuming the data values to be of one fixed size, namely the first predetermined size, and if the data values are in fact of that first predetermined size, the endian conversion operation is completed as soon as the re-ordering operation performed by the first swizzle circuitry has been performed. The additional circuitry required to deal with data value sizes other than the first predetermined size is then placed off the critical path, and such additional re-ordering can be performed in the next clock cycle. For embodiments where the vast majority of the data values handled are of the first predetermined size, this can give rise to significant performance improvements. Further, in one embodiment, it has been found that for data values that are not of the first predetermined size, an additional clock cycle is already required for accessing those data values in any event, and accordingly there is no additional impact in requiring the second swizzle circuitry to perform the additional re-ordering operation in the next clock cycle.

In one embodiment, the swizzle circuitry provides two data paths, a first data path passing from an input through the first swizzle circuitry to an output, and a second data path passing from the input through the first swizzle circuitry and the second swizzle circuitry to the output, data routed through the second path taking at least one cycle longer to reach the output than data routed through the first path. Hence, in such embodiments, the first data path provides a fast data path for performing endian conversion of data values of the first predetermined size.

In one embodiment, the second data path is pipelined with the reordered data produced by the first swizzle circuitry being latched before being input to the second swizzle circuitry in a subsequent clock cycle.

The first circuitry and second circuitry between which the swizzling circuitry resides can take a variety of forms. However, in one particular embodiment, the first circuitry is a cache and said second circuitry is a processing unit, the swizzle circuitry operating on data values requested from the cache by the processing unit. It has been found that the read path from the cache to the processing unit can become a critical path, and the use of the swizzle circuitry of embodiments of the present invention enables a reduction in the complexity of the logic required to be provided on that critical path, thereby significantly improving processing speed. Further, it has been found that most of the data values accessed by the processing unit from the cache are of a particular size, and accordingly by optimising the first swizzle circuitry to perform the endian conversion operation for that particular size, significant performance benefits are realised.

The choice as to the first predetermined size for which the first swizzle circuitry is optimised can vary dependent on embodiment. However, in one embodiment, the first predetermined size is a word, i.e. four bytes. The multiple sizes of data values that may be supported within the data processing apparatus can also vary dependent on embodiment. However, in one particular embodiment the data values are of size word, half word or byte.

The size of the component data elements forming each data value can also vary dependent on embodiment. However, in a particular embodiment, each data element comprises one byte.

The size of the block of data input to the swizzle circuitry can also be varied dependent on embodiment. However, in one embodiment the block of data has a multiple word size. In one particular embodiment, the block of data has a double word size, and hence may contain two data words, four half words or eight bytes.

The swizzle circuitry of example embodiments may be used to convert from little-endian to big-endian format or from big-endian to little-endian format. In one particular embodiment, the first endian format is big-endian and the second endian format is little-endian.

Viewed from a second aspect, the technology described provides swizzle circuitry for receiving a block of data containing at least one data value, and converting each data value in the block from a first endian format to a second endian format, the swizzle circuitry comprising: first swizzle circuitry for performing a reordering operation on the block of data assuming the at least one data value contained therein is of a first predetermined size, in order to produce reordered data; and second swizzle circuitry responsive to an indication that the at least one data value is of a size different to said first predetermined size to perform an additional reordering operation on the reordered data having regard to the size of the at least one data value in order to convert each of the at least one data value to the second endian format; the swizzle circuitry being responsive to an indication that the at least one data value is of said first predetermined size to output the reordered data produced by the first swizzle circuitry, whereas otherwise the swizzle circuitry outputs the data produced by the second swizzle circuitry.

Viewed from a third aspect, the technology described provides a method of converting data values from a first endian format to a second endian format in a data processing apparatus having first circuitry for handling different sized data values according to the first endian format, each data value consisting of a number of data elements with the number being dependent on the data value size, and second circuitry for handling the data values according to the second endian format where the data elements of the data values are ordered differently with respect to their ordering in the first endian format, the method comprising the steps of: (i) receiving from the first circuitry a block of data containing at least one data value; (ii) performing a reordering operation on the block of data assuming the at least one data value contained therein is of a first predetermined size, in order to produce reordered data; (iii) responsive to an indication that the at least one data value is of a size different to said first predetermined size, performing an additional reordering operation on the reordered data having regard to the size of the at least one data value in order to convert each of the at least one data value to the second endian format; and (iv) responsive to an indication that the at least one data value is of said first predetermined size, outputting to the second circuitry the reordered data produced at said step (ii), whereas otherwise outputting to the second circuitry the data produced at said step (iii).

Viewed from a fourth aspect, the technology described provides swizzle logic for receiving a block of data containing at least one data value, and converting each data value in the block from a first endian format to a second endian format, the swizzle logic comprising: first swizzle means for performing a reordering operation on the block of data assuming the at least one data value contained therein is of a first predetermined size, in order to produce reordered data; and second swizzle means, responsive to an indication that the at least one data value is of a size different to said first predetermined size, for performing an additional reordering operation on the reordered data having regard to the size of the at least one data value in order to convert each of the at least one data value to the second endian format; the swizzle logic being responsive to an indication that the at least one data value is of said first predetermined size to output the reordered data produced by the first swizzle means, whereas otherwise the swizzle logic outputs the data produced by the second swizzle means.

BRIEF DESCRIPTION OF THE DRAWINGS

FIG. 7 is a diagram illustrating big-endian to little-endian conversions for load operations of size byte, half word or word.

DETAILED DESCRIPTION

Figure 1:
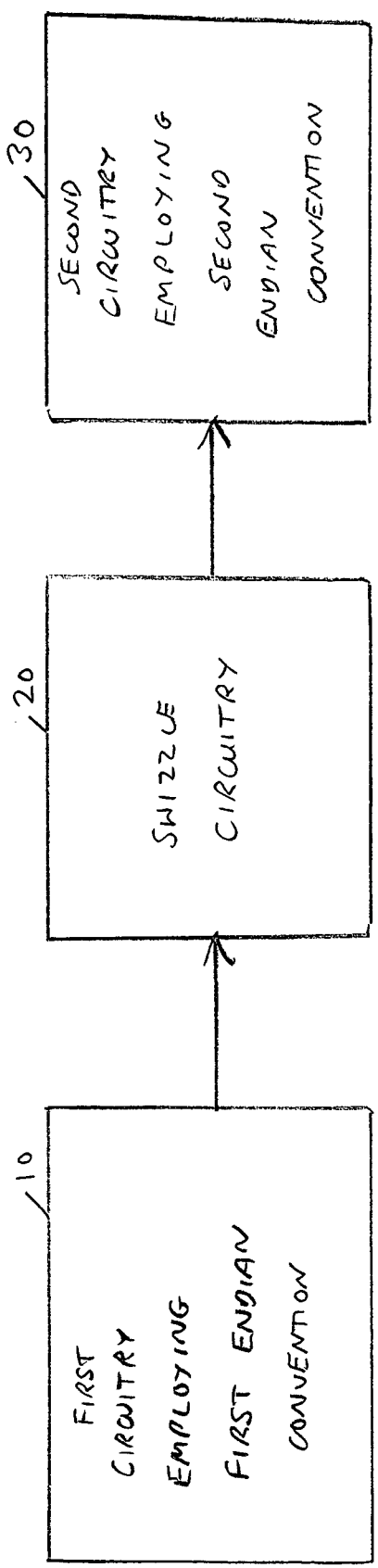
FIG. 1 is a block diagram of a data processing apparatus in accordance with one example embodiment.

FIG. 1 is a block diagram of a data processing apparatus in accordance with one example embodiment. As shown in FIG. 1, the data processing apparatus has first circuitry 10 which employs a first endian convention. Similarly, second circuitry 30 is provided which employs a second endian convention. Hence, if the first circuitry employs the little-endian convention, the second circuitry employs big-endian convention, and conversely if the first circuitry employs the big-endian convention, the second circuitry employs the little-endian convention. If data is to be passed from the first circuitry to the second circuitry 30, then an endian conversion operation will be required in order to enable the second circuitry to correctly interpret the data it receives from the first circuitry 10. This endian conversion operation is performed by the swizzle circuitry 20.

Figure 2:
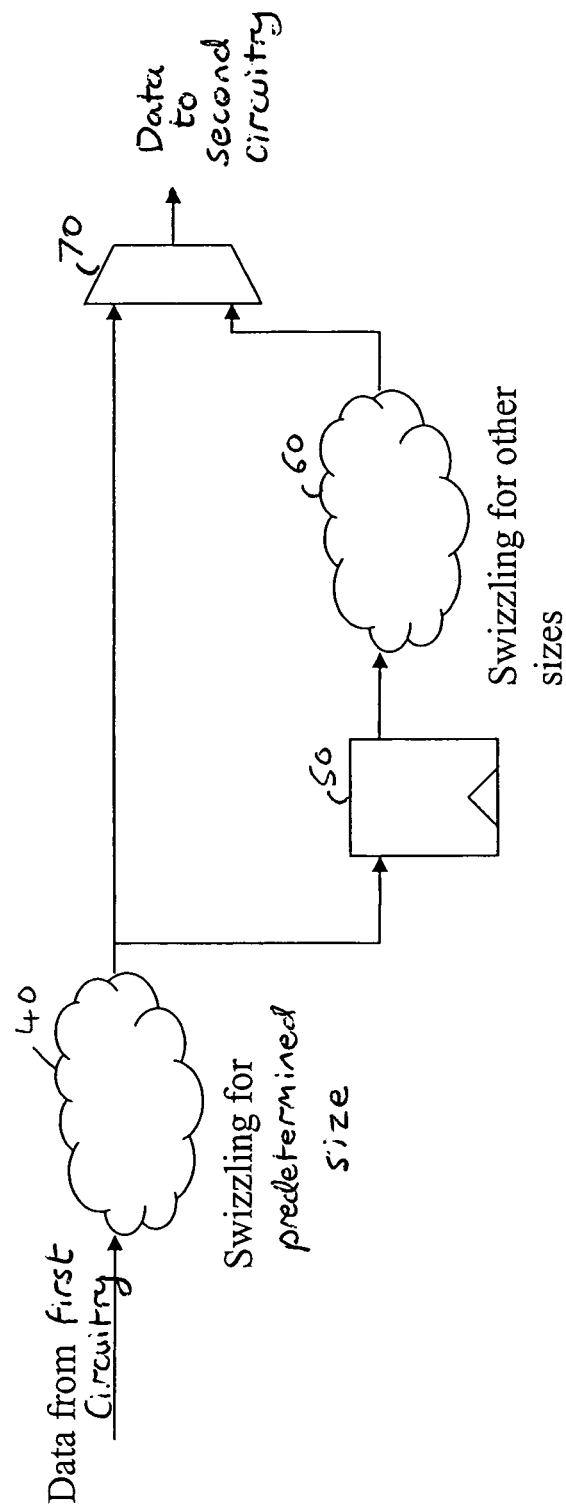
FIG. 2 is a diagram illustrating the swizzle circuitry of FIG. 1 in accordance with one example embodiment.

The swizzle circuitry 20 of FIG. 1 is illustrated in more detail in FIG. 2. As shown in FIG. 2, the swizzle circuitry 20 comprises first swizzle circuitry 40 for performing a re-ordering operation on the data obtained from the first circuitry 10, this re-ordering operation also being referred to herein as a swizzling operation. For the purposes of the re-ordering operation performed by the first swizzle circuitry 40, it is assumed that the one or more data values contained within the data received from the first circuitry 10 are of a first predetermined size, for example a word size, and the re-ordering operation performed is hence that required to convert from the first endian convention to the second endian convention for data values of that predetermined size. The re-ordered data produced by the first re-ordering circuit is forwarded to the multiplexer 70 and also latched within the register 50.

The multiplexer 70 is arranged to receive a control signal identifying whether the data value or data values contained within the data received from the first circuitry 10 are in fact of the predetermined size assumed by the first swizzle circuitry 40. If they are, then the multiplexer 70 is arranged to output to the second circuitry 30 the re-ordered data that it receives from the first swizzle circuitry.

The data output from the multiplexer 70 to the second circuitry 30 is accompanied by a valid signal indicating to the second circuitry whether the data is valid. If the size of the data values is the predetermined size, the data output from the multiplexer 70 based on the input received from the first swizzle circuitry 40 will be valid, and the valid signal will be asserted. However, if the control signal received by the multiplexer 70 indicates that the data values contained within the data from the first circuitry in fact has a different size to the predetermined size assumed by the first swizzle circuitry 40, then the valid signal will be de-asserted to indicate to the second circuitry 30 that the data output from the multiplexer 70 in this cycle should be ignored.

In this latter event, in the next cycle, the re-ordered data as stored within the register 50 is input to the second swizzle circuitry 60 which performs an additional re-ordering operation on the re-ordered data received from the register 50, this additional re-ordering operation taking into account the actual size of the data values contained within the data received from the first circuitry 10. Accordingly, the second swizzle circuitry 60 will produce at its output data which has been correctly converted from the first endian convention to the second endian convention based on the actual size of the data values contained within the data. The control signal received by the multiplexer 70 will now cause the output from the second swizzle circuitry 60 to be forwarded to the second circuitry 30, at which point the valid signal will be asserted to identify to the second circuitry 30 that the data being output to it is valid.

In accordance with the embodiment illustrated in FIG. 2, the first swizzle circuitry 40 can be kept significantly less complex than would be the case if it were to be able to handle full endian conversion for multiple different sizes of data, and accordingly for data values that are in fact of the predetermined size assumed by the first swizzle circuitry, the endian conversion operation can be performed very quickly, and in practice can be comfortably accommodated within a clock cycle where certain other steps are taken with respect to the data before it is actually input to the first swizzle circuitry 40. However, if the data values are actually of a size other than the predetermined size assumed by the first swizzle circuitry, then an extra cycle is required to enable the second swizzle circuitry 60 to perform the required endian conversion operation, for example by de-swizzling from the predetermined size, and then re-swizzling for the actual data value size.

Such an approach significantly alleviates the burden placed upon the path including the first swizzle circuitry 40, thereby reducing that critical path. Assuming that the majority of data values passed from the first circuitry 10 to the second circuitry 30 are indeed of the predetermined size, this can give rise to significant performance benefits.

Figure 3:
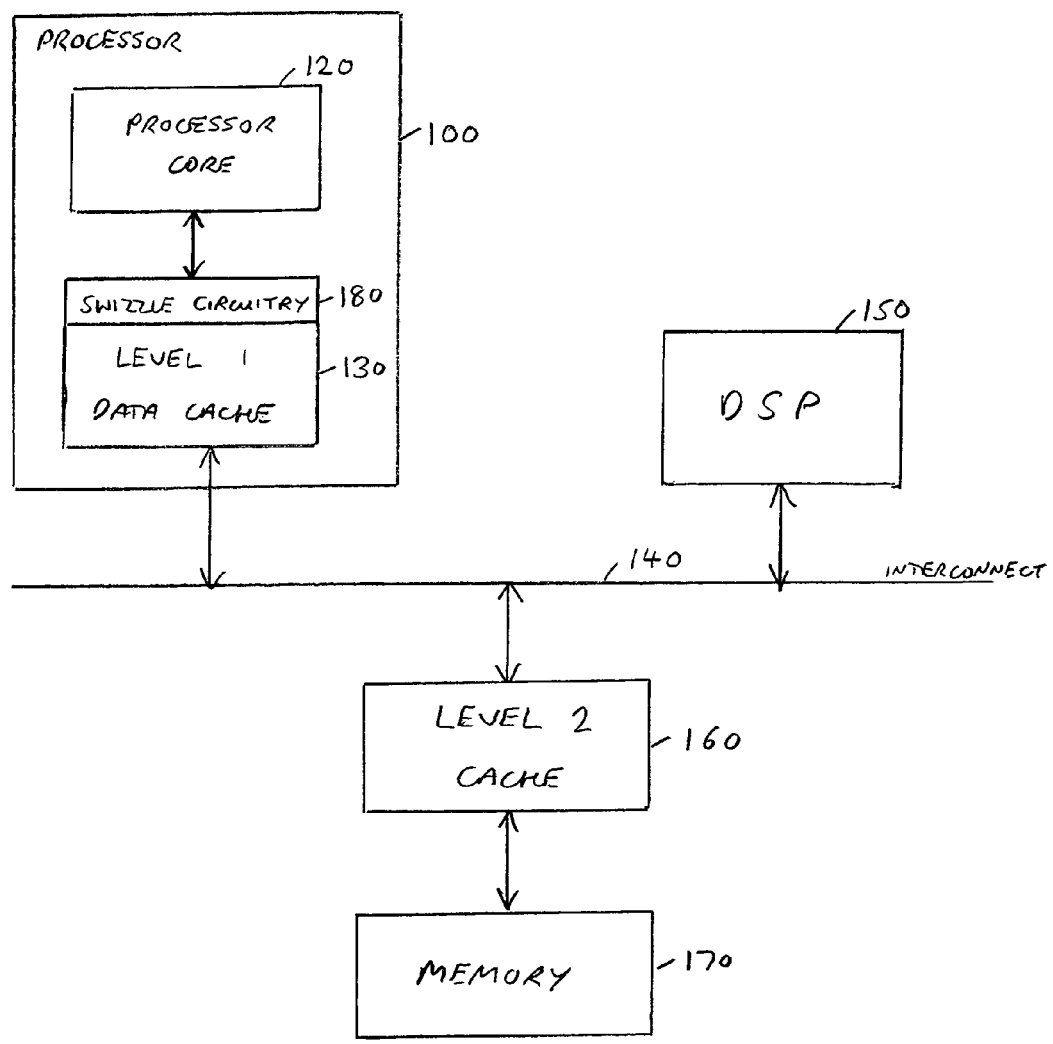
FIG. 3 is a block diagram of a data processing apparatus in accordance with an alternative example embodiment.

FIG. 3 is a block diagram of a data processing apparatus in accordance with one example embodiment. As shown in FIG. 3, a processor 100 is provided having a processor core 120 coupled to a level one data cache 130, the data cache 130 being used to store data values for access by the processor core 120 when performing data processing operations. The processor 100 is connected to a bus interconnect 140 via which it can be coupled with other devices such as the digital signal processor (DSP) 150 shown, and with a memory system, the memory system in this example consisting of a level two cache 160 coupled to memory 170. The other devices that can be connected to the bus interconnect 140 can take a variety of forms, and hence can for example be other master devices initiating transactions on the bus interconnect, and/or one or more slave devices used to process transactions issued by master devices on the bus interconnect 140. The processor 100 is an example of a master device, and it will be appreciated that one or more of the other devices may be another processor constructed similarly to processor 100.

When the processor core 120 wishes to access a data value in memory 170, it outputs an access request specifying an address of that data value in memory 170. This access request is received by the level one data cache 130, and assuming the access request pertains to a cacheable region of memory, the level one data cache 130 is arranged to perform a lookup operation in the data cache to determine whether the data value the subject of the access request is present in the cache. If it is, then the data value can be accessed directly in the level one data cache 130 without the need to output a request to memory, thereby significantly saving access time to that data value. Accordingly, if the access request is a read access request, the required data value will be returned from the level one data cache 130 to the processor core 120. If instead the access request is a write access request, then the updated data value output by the processor core 120 can be written into the relevant cache line of the level one data cache 130.

When on performing a lookup operation, it is determined that the data value the subject of the access request is stored within the cache, this is referred to as a cache hit. Conversely, if on performing the lookup operation the data value is not found within the cache, then this is referred to as a cache miss. In the event of a cache miss within the level one data cache 130, the level one data cache will typically output a linefill request to the level two cache 160 via the interconnect 140. This will typically take the form of an access request to the level two cache 160 requesting content from the level two cache 160 sufficient to fill a cache line within the level one data cache, that requested content including the data value initially requested by the processor core 120.

In an analogous manner to that discussed earlier with reference to the level one data cache 130, if the requested content is in the level two cache 160, then it will be returned to the level one data cache 130 (i.e. a hit will occur within the level two cache 160), whereas otherwise a cache miss will be detected, and the level two cache will output a linefill request to memory 170, this linefill request seeking to access data from memory sufficient to fill one of the cache lines in the level two cache, the data requested including the data value initially requested by the processor core 120. Typically, although this is not essential, the cache lines in the level two cache are larger than the cache lines in the level one cache, and accordingly if a hit is detected in the level two cache 160, it will not generally be necessary to output the entire contents of the hit cache line back to the level one data cache 130.

In the embodiment illustrated in FIG. 3, it is assumed that the processor core 120 operates on data values according to a first endian format, but the data it receives from external to the processor 100 may have been generated by a device handling data values according to the second endian format. In particular, in one example, it is assumed that the processor core 120 operates on little-endian data, but the DSP 150 may operate on big-endian data. As a result, the DSP 150 may store data into the memory system in big-endian format, and that data may later be retrieved into the level one data cache 130. Prior to that data being passed to the processor core 120, it will be necessary for an endian conversion operation to be performed to convert the data from big-endian to little-endian format. Similarly, for data written from the processor core to memory, it will be necessary to perform an endian conversion operation to convert the data from little-endian format to big-endian format. Accordingly, swizzle circuitry 180 is provided for performing such conversion operations.

For write operations, there is typically more time to perform the endian conversion operation before the data is written to the level one data cache 130 or to subsequent levels of the memory. Accordingly, the swizzle circuitry provided on the write path can be arranged in a conventional manner to support all required conversion operations having regard to the size of the data values being written. However, on the read path from the level one data cache 130 into the processor core 120, there is significantly less time within the clock cycle that the data is output from the level one data cache 130 to perform any required swizzling of the data values. Accordingly, on the read path from the level one data cache 130 to the processor core 120, the swizzle circuitry is arranged in accordance with example embodiments and in particular is in one example embodiment arranged as shown in FIG. 5.

Figure 5:
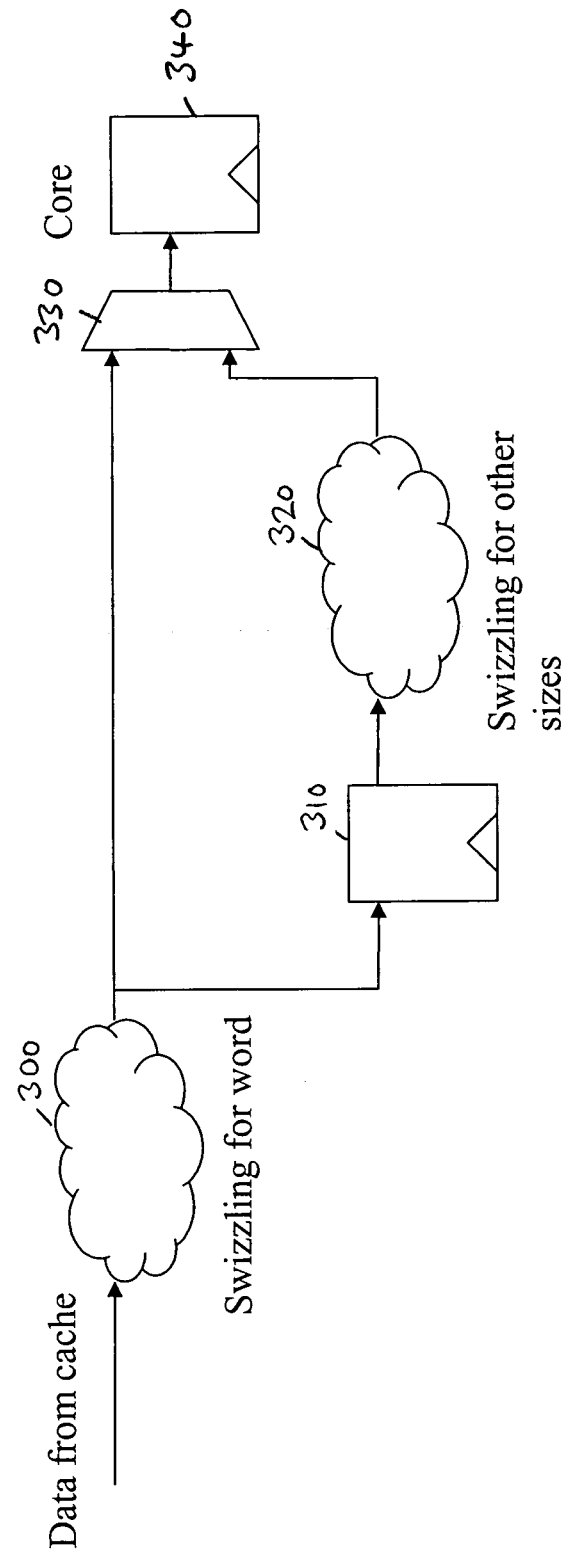
FIG. 5 is a diagram illustrating the swizzle circuitry of FIG. 3 in accordance with one example embodiment.

From a comparison of FIG. 5 with the earlier-mentioned FIG. 2, it will be seen that the swizzle circuitry provided on the read path operates in an analogous manner to the swizzle circuitry 20 of FIG. 1. In particular, the elements 300, 310, 320 and 330 operate in an identical manner to the elements 40, 50, 60, 70 described earlier with reference to FIG. 2, and accordingly will not be described further herein. It should be noted that in this example, the data input to the first swizzle circuitry 300 comes from the cache 130, and the predetermined size assumed by the first swizzle circuitry is a word size, i.e. four bytes. The second swizzle circuitry 320 then is used to perform any required swizzling for other data sizes, for example half word or byte size data values. The output from the multiplexer 330 is latched within the register 340, from where it is then provided to the processor core 120. Again, valid signals are passed to the processor core 120 along with the output from the register 340, to identify whether the data is valid, or instead should be ignored.

Figure 4:
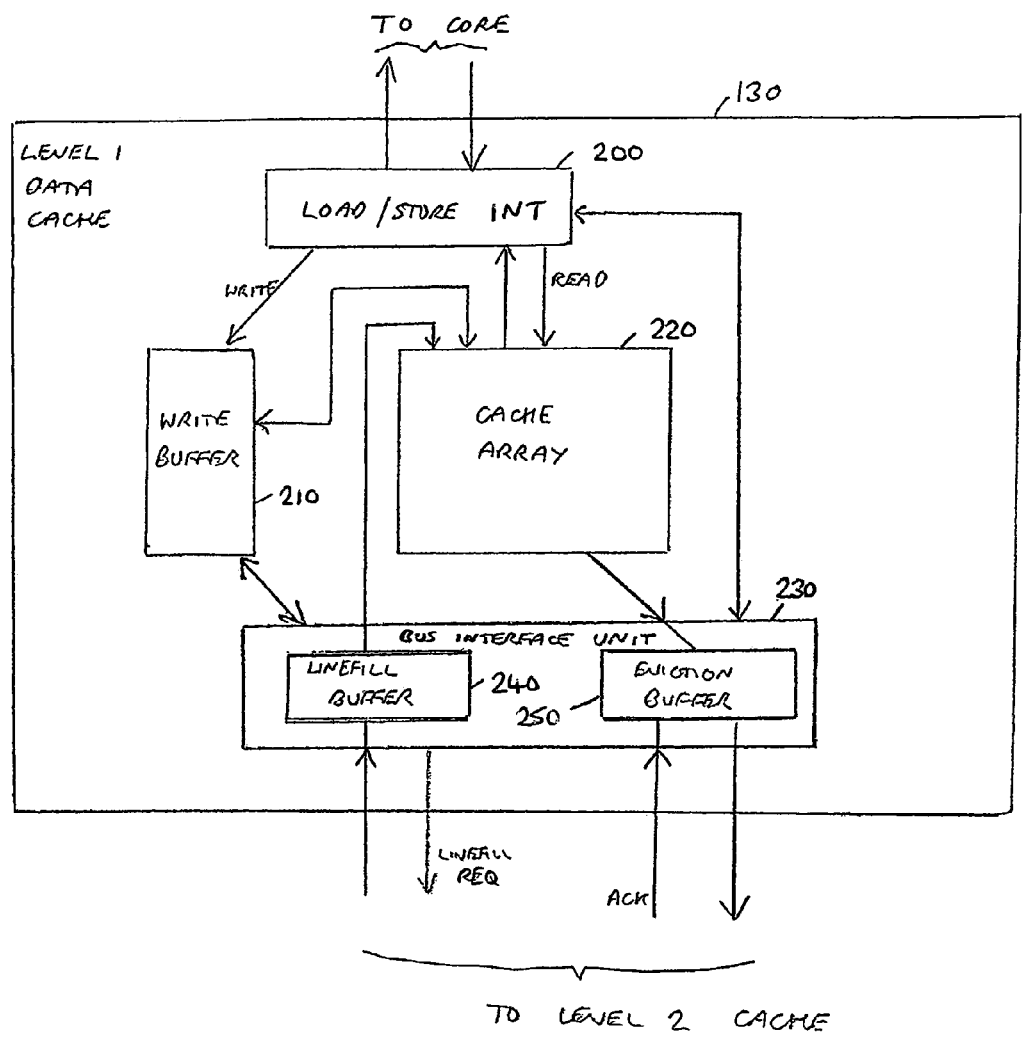
FIG. 4 is a block diagram illustrating in more detail the level one data cache of FIG. 3 in accordance with one example embodiment.

FIG. 4 is a block diagram illustrating in more detail the logic provided within the level one data cache 130 of FIG. 3 in accordance with one example embodiment. As shown in FIG. 4, the cache 130 has a load/store interface 200 for interfacing with the processor core, which is arranged to receive read and write access requests from the processor core. For read access requests, a lookup operation is performed within the cache array 220 in order to determine whether the requested data value is in the cache array, and if so that data value is returned via the load/store interface to the processor core. In the event of a cache miss for a read access request, the load/store interface 200 is arranged to instruct the bus interface unit 230 to perform a linefill process. To perform the linefill process, a cache line within the cache array 220 is selected as a victim cache line, and its current contents are forwarded to the eviction buffer 250, from where they are output to the level two cache. Subsequently an acknowledgement signal will be received by the eviction buffer 250 confirming that the data output has been stored in the level two cache, whereafter that entry in the eviction buffer can be removed. In addition to performing the eviction, the bus interface unit 230 will also initiate a linefill request to cause a cache line's worth of data forming new content to fill the victim cache line to be retrieved from the level two cache, that retrieved new content being received by the linefill buffer 240 within the bus interface unit 230. Once the new content has been received by the linefill buffer, it is forwarded to the cache array 220 for storing in the victim cache line.

Any write accesses received by the load/store interface 200 are forwarded to a write buffer 210 which is responsible for handling those write accesses. When a particular write access request is processed by the write buffer, a lookup request can be performed within the cache array 220 in an analogous way to that performed by the load/store interface 200 for read accesses, and in the event of a hit, the write buffer can output the required data for storing in the relevant cache line of the cache array 220. In the event of a miss, the write buffer 210 will then communicate with the bus interface unit 230 to perform a linefill process, this being analogous to the earlier described linefill process initiated by the load/store interface 200 in respect of a read miss.

In accordance with one example embodiment, the swizzle circuitry illustrated in FIG. 5 is actually contained within the load/store interface 200 of the level one data cache 130. However, in alternative embodiments, the swizzle circuitry can be provided elsewhere in the path between the processor core 120 and the level one data cache 130.

Figure 6:
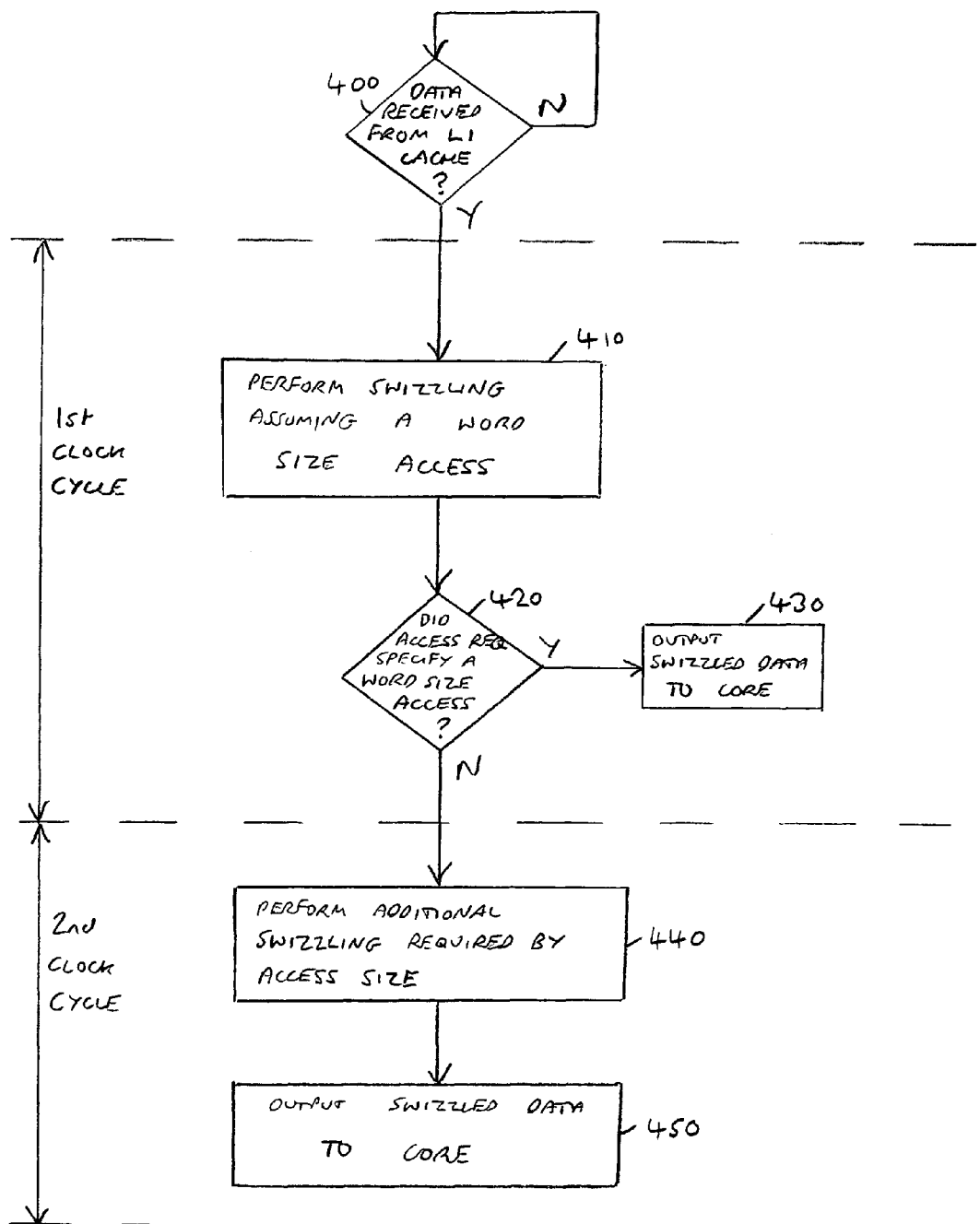
FIG. 6 is a flow diagram illustrating the operation of the swizzle circuitry of FIG. 5 in accordance with one example embodiment.
Figure 8A:
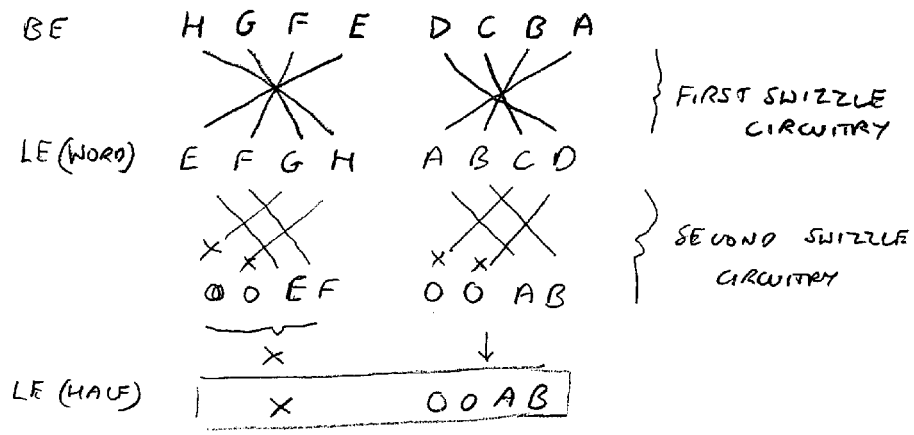
FIGS. 8A to 8D schematically illustrate the re-ordering operations performed by the circuitry 300, 320 of FIG. 5 for four example load operations according to one example embodiment.
Figure 8B:
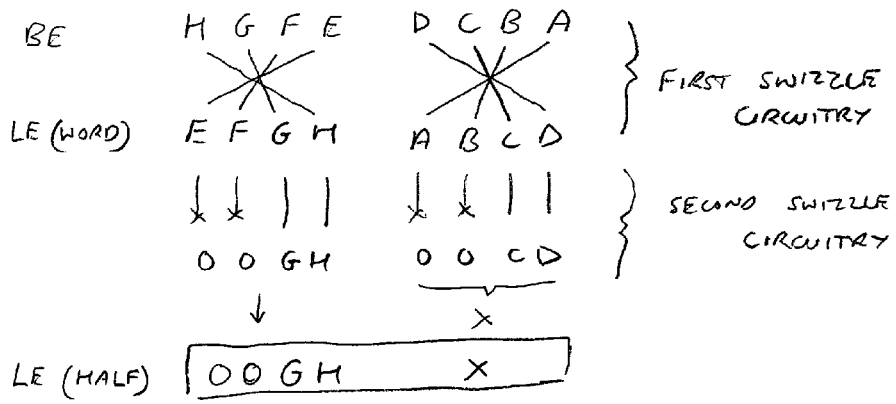
Figure 8C:
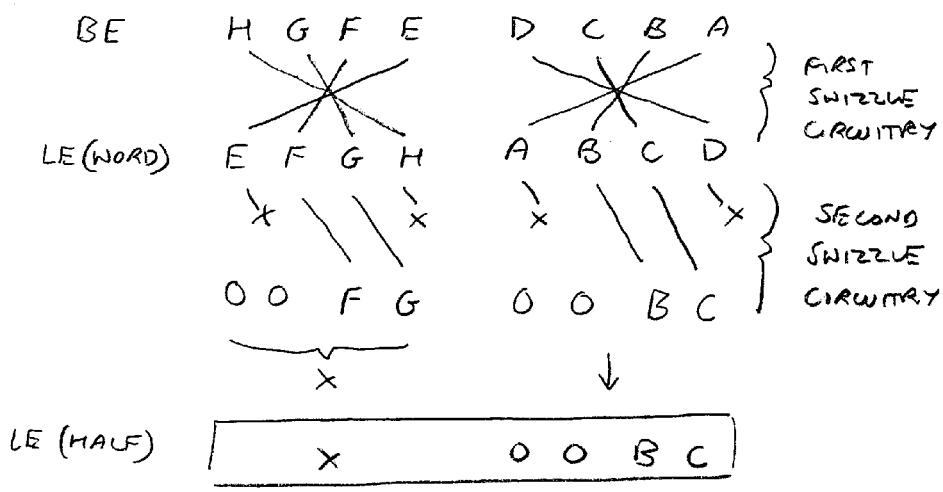
Figure 8D:
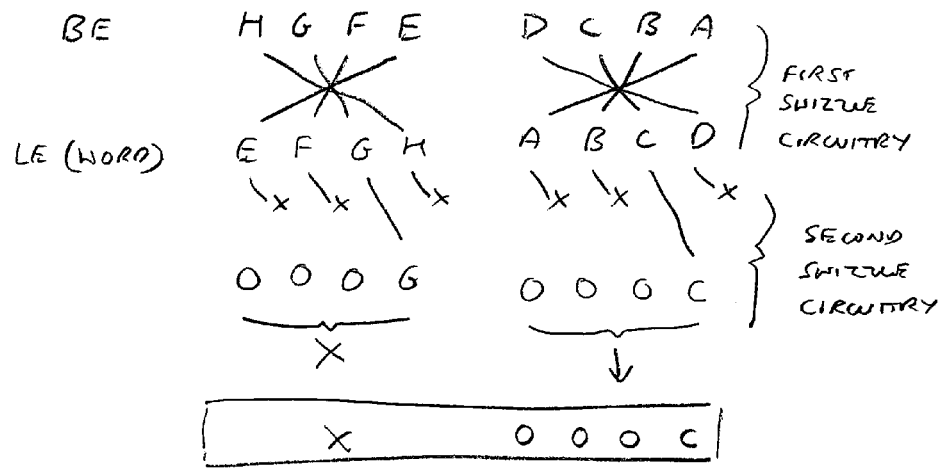

FIG. 6 is a flow diagram illustrating the operation of the swizzle circuitry of FIG. 5 in accordance with one example embodiment. At step 400, it is determined whether data has been received from the level one data cache 130. When such data is received, then at step 410 swizzling is performed in relation to that data assuming that the data values within that data are of a word size. The swizzling performed at step 410 is performed by the first swizzle circuitry 300 of FIG. 5.

Thereafter at step 420, it is determined whether the access request did specify a word size access, and if so the swizzle data is output to the processor core 120 at step 430 via the multiplexer 330 and register 340. Steps 410, 420 and 430 can occur in a first clock cycle, and indeed will typically occur towards the end of that clock cycle, since other steps will be performed in relation to the data prior to it being swizzled. For example, in one embodiment this first clock cycle is used to retrieve the data from the cache array 220 and latch that data into the load/store interface 200 before sending the data to the processor core 120. The swizzling at the predetermined (word) size is performed at the end of this clock cycle.

If at step 420 it is determined that the access request did not specify a word size access, then the process proceeds to step 440, where additional swizzling is performed as required having regard to the actual access size of the data being accessed. This additional swizzling is performed by the second swizzle circuitry 320 of FIG. 5. Thereafter, at step 450, the swizzled data is output to the processor core via the multiplexer 330 and the register 340. Steps 440 and 450 are performed in a second clock cycle following the first clock cycle.

In accordance with one example embodiment, the data path between the level one data cache 130 and the processor core 120 is two words wide, and accordingly each read access request issued by the processor core 120 results in eight bytes of data being returned to the processor core 120. Depending on the size of the access, this will represent two words, four half words, or eight bytes.

FIG. 7 schematically illustrates the endian conversion operation performed by the swizzle circuitry of FIG. 5 for byte, half word or word accesses to a variety of memory locations. In particular, it is assumed that an access to memory address 100 will result in the bytes HGFEDCBA being retrieved, where byte A is at address 100 and byte H is at address 107. Similarly, an access request specifying address 108 will result in bytes PONMLKJI being retrieved, where byte I is at address 108 and byte P is at address 115. Assuming the data at these addresses in memory was actually written in big-endian format, this will mean that the most significant byte is identified at address 100. Hence, considering the example of a word consisting of bytes DCBA, then if that word was written in big-endian format, byte A is the most significant byte and byte D is the least significant byte. Since the processor core 120 operates on data in little-endian format, a conversion needs to be performed using the swizzle circuitry 180 in order to place the data in the correct endian format before it is passed to the processor core 120.

FIG. 7 illustrates the endian conversion required when a LDRB, LDRH, or LDR instruction is executed specifying as a start address any of addresses 100 through 107. An LDRB instruction is a load instruction of access size byte. Since a byte is the smallest addressable data element, then the endian reverse operation results in no change, as shown in FIG. 7. The LDRH instruction is a load instruction for a data access size of half word, and accordingly the endian reverse operation results in the relevant two bytes being swapped. Finally, the LDR instruction is a load instruction of access size word, and as can be seen in FIG. 7 the endian reverse operation results in the ordering of the relevant four bytes being reversed.

FIGS. 8A to 8D are diagrams illustrating the re-ordering operations performed by both the first swizzle circuitry 300 and the second swizzle circuitry 320 of FIG. 5 when processing four specific examples of load instructions whose access size is not the word access size, and accordingly the re-ordering operation performed by the first swizzle circuitry 300 is not sufficient to produce the correct endian conversion. As can be seen from FIGS. 8A to 8D, the operation performed by the first swizzle circuitry is always the same irrespective of the access taking place, and it is this which enables the size of the first swizzle circuitry 300 to be kept relatively small, and therefore alleviate the time constraints on the critical path.

In contrast, the operation performed by the second swizzle circuitry varies dependent on the address being accessed and the access size, but the result of both the re-ordering operation performed by the first swizzle circuitry and the additional re-ordering operation performed by the second swizzle circuitry is that the required data value is output to the processor core in the correct little-endian format required by the processor core 120.

From the above description of example embodiments of the, it will be appreciated that such example embodiments enable less complex endian conversion circuitry to be placed on a critical path, because on the critical path the required swizzling operation is performed speculatively on the expectation that a data value of a predetermined size is being accessed. By using less gates, this reduces the path, and alleviates the timing constraints. In one particular embodiment, the first swizzle circuitry on the critical path assumes that the data size is a word size. It is noted that in accordance with the techniques of example embodiments an extra clock cycle is needed when the data values being accessed are not of a word size, since the swizzling performed by the first circuitry is not done correctly for such sizes. However, it has been found that it is often the case that the majority of the accesses do relate to word size accesses, and accordingly the potential timing impact on accesses which are not of word size is more than outweighed by the improved speed that can be obtained for word size accesses. Furthermore, in several embodiments, it has been found that the extra clock cycle needed for handling the swizzling in relation to sizes other than word sizes has no impact, since each access of a size other than a word size already needs an additional cycle to perform further processing, for example to re-align the data. By performing this additional swizzling in the additional cycle, this reduces the constraints on the critical path.

Although particular example embodiments have been described, it will be apparent that the claims are not limited thereto, and that many modifications and additions may be made within the scope of the claims.

We claim:

1. A data processing apparatus comprising:
    first circuitry configured to handle different sized data values according to a first endian format, each data value consisting of a number of data elements with the number being dependent on the data value size;
    second circuitry configured to handle the data values according to a second endian format where the data elements of the data values are ordered differently with respect to their ordering in the first endian format;
    swizzle circuitry configured to receive from the first circuitry a block of data containing at least one data value, and converting each data value in the block from the first endian format to the second endian format, the swizzle circuitry comprising:
    first swizzle circuitry configured to perform a reordering operation on the block of data assuming the at least one data value contained therein is of a first predetermined size, in order to produce reordered data;
    second swizzle circuitry, separate from said first swizzle circuitry, responsive to an indication that the at least one data value is of a size different to said first predetermined size and configured to perform an additional reordering operation on the reordered data having regard to the size of the at least one data value in order to convert each of the at least one data value to the second endian format;
    the swizzle circuitry being configured to output to the second circuitry, in response to an indication that the at least one data value is of said first predetermined size, the reordered data produced by the first swizzle circuitry, and otherwise to output to the second circuitry the data produced by the second swizzle circuitry,
    wherein the swizzle circuitry provides two data paths, a first data passing from an input through the first swizzle circuitry to an output, and a second data path passing from the input through the first swizzle circuitry and the second swizzle circuitry to the output, data routed through the second path taking at least one cycle longer to reach the output than data routed through the first path.

2. A data processing apparatus as claimed in claim 1, wherein the second swizzle circuitry is arranged to perform the additional reordering operation in at least one clock cycle subsequent to a clock cycle in which the reordered data is produced by the first swizzle circuitry, whereby if the at least one data value is of said first predetermined size, the swizzle circuitry converts each data value in the block from the first endian format to the second endian format at least one clock cycle more quickly than if the at least one data value is of a size other than said first predetermined size.

3. A data processing apparatus as claimed in claim 2, wherein the first swizzle circuitry is arranged to perform the reordering operation in a first clock cycle, and the second swizzle circuitry is arranged to perform the additional reordering operation in a next clock cycle, whereby if the at least one data value is of said first predetermined size, the swizzle circuitry converts each data value in the block from the first endian format to the second endian format one clock cycle more quickly than if the at least one data value is of a size other than said first predetermined size.

4. A data processing apparatus as claimed in claim 1, wherein the second data path is pipelined with the reordered data produced by the first swizzle circuitry being latched before being input to the second swizzle circuitry in a subsequent clock cycle.

5. A data processing apparatus as claimed in claim 1, wherein said first circuitry is a cache and said second circuitry is a processing unit, the swizzle circuitry operating on data values requested from the cache by the processing unit.

6. A data processing apparatus as claimed in claim 1, wherein the first predetermined size is a word.

7. A data processing apparatus as claimed in claim 6, wherein the data values are of size word, half word or byte.

8. A data processing apparatus as claimed in claim 1, wherein each data element comprises one byte.

9. A data processing apparatus as claimed in claim 1, wherein the block of data has a multiple word size.

10. A data processing apparatus as claimed in claim 1, wherein said first endian format is big endian and said second endian format is little endian.

11. Swizzle circuitry for receiving a block of data containing at least one data value, and converting each data value in the block from a first endian format to a second endian format, the swizzle circuitry comprising:
    first swizzle circuitry configured to perform a reordering operation on the block of data assuming the at least one data value contained therein is of a first predetermined size, in order to produce reordered data; and
    second swizzle circuitry, separate from said first swizzle circuitry, responsive to an indication that the at least one data value is of a size different to said first predetermined size and configured to perform an additional reordering operation on the reordered data having regard to the size of the at least one data value in order to convert each of the at least one data value to the second endian format;
the swizzle circuitry being configured to output, in response to an indication that the at least one data value is of said first predetermined size, the reordered data produced by the first swizzle circuitry, and otherwise to output the data produced by the second swizzle circuitry, wherein the swizzle circuitry provides two data paths, a first path passing from an input through the first swizzle circuitry to an output, and a second data path passing from the input through the first swizzle circuitry and the second swizzle circuitry to the output, data routed through the second path taking at least one cycle longer to reach the output than data routed through the first path.

12. A method of converting data values from a first endian format to a second endian format in a data processing apparatus having first circuitry for handling different sized data values according to the first endian format, each data value consisting of a number of data elements with the number being dependent on the data value size, and second circuitry for handling the data values according to the second endian format where the data elements of the data values are ordered differently with respect to their ordering in the first endian format, the method comprising the steps of:

(i) receiving from the first circuitry a block of data containing at least one data value;

(ii) performing, using first swizzle circuitry, a reordering operation on the block of data assuming the at least one data value contained therein is of a first predetermined size, in order to produce reordered data;

(iii) responsive to an indication that the at least one data value is of a size different to said first predetermined size, performing, using second swizzle circuitry separate from said first swizzle circuitry, an additional reordering operation on the reordered data having regard to the size of the at least one data value in order to convert each of the at least one data value to the second endian format; and (iv) responsive to an indication that the at least one data value is of said first predetermined size, outputting to the second circuitry the reordered data produced at said step (ii), whereas otherwise outputting to the second circuitry the data produced at said step (iii), (v) providing two data paths, a first data path passing from an input through the first swizzle circuitry to an output, and a second data path passing from the input through the first swizzle circuitry an the second swizzle cuircutryt to the output, data routed through the second path taking at least one cycle longer to reach the output than data routed through the first path.

13. Swizzle logic for receiving a block of data containing at least one data value, and converting each data value in the block from a first endian format to a second endian format, the swizzle logic comprising:

first swizzle means for performing a reordering operation on the block of data assuming the at least one data value contained therein is of a first predetermined size, in order to produce reordered data; and second swizzle means, separate from said first swizzle means and responsive to an indication that the at least one data value is of a size different to said first predetermined size, for performing an additional reordering operation on the reordered data having regard to the size of the at least one data value in order to convert each of the at least one data value to the second endian format;

the swizzle logic being responsive to an indication that the at least one data value is of said first predetermined size to output the reordered data produced by the first swizzle means, whereas otherwise the swizzle logic outputs the data produced by the second swizzle means, wherein the swizzle logic provides two data paths, a first data path passing from an input through the first swizzle means to an output, and a second data path passing from the input through the first swizzle means and the second swizzle means to the output, data routed through the second path taking at least one cycle longer to reach the output than data routed through the first path.

* * * * *